US012518897B2

(12) United States Patent
Hattori et al.

(10) Patent No.: US 12,518,897 B2
(45) Date of Patent: Jan. 6, 2026

(54) VARISTOR COMPONENT

(71) Applicant: Panasonic Intellectual Property Management Co., Ltd., Osaka (JP)

(72) Inventors: Masaya Hattori, Tokyo (JP); Takeshi Fujii, Osaka (JP); Yasuhiko Sasaki, Tokyo (JP); Yoshiyuki Saito, Tokyo (JP); Tomohide Kamiyama, Tokyo (JP); Ken Yanai, Hokkaido (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 399 days.

(21) Appl. No.: 18/263,647

(22) PCT Filed: Feb. 8, 2022

(86) PCT No.: PCT/JP2022/004845
§ 371 (c)(1),
(2) Date: Jul. 31, 2023

(87) PCT Pub. No.: WO2022/168986
PCT Pub. Date: Aug. 11, 2022

(65) Prior Publication Data

US 2024/0312677 A1 Sep. 19, 2024

(30) Foreign Application Priority Data

Feb. 8, 2021 (JP) ................................ 2021-017941

(51) Int. Cl.
*H01C 1/148* (2006.01)
*H01C 7/102* (2006.01)

(52) U.S. Cl.
CPC ............ *H01C 1/148* (2013.01); *H01C 7/102* (2013.01)

(58) Field of Classification Search
CPC ................................ H01C 1/148; H01C 7/102
See application file for complete search history.

(56) References Cited

U.S. PATENT DOCUMENTS 5,159,300 A * 10/1992 Nakamura ........... H03H 1/0007 338/21
7,576,965 B2 * 8/2009 Terada ................. H03H 7/1708 361/119

(Continued)

FOREIGN PATENT DOCUMENTS

JP 63-211602 B2 9/1988

OTHER PUBLICATIONS

International Search Report issued on Apr. 19, 2022 in International Patent Application No. PCT/JP2022/004845, with English translation.

*Primary Examiner* — Kyung S Lee
(74) *Attorney, Agent, or Firm* — Rimon P.C.

(57) ABSTRACT

A varistor component includes: a varistor-material sintered body; a first external electrode provided on a portion of a first lateral surface; a second external electrode provided on a portion of the first lateral surface; and a third external electrode provided on a portion of a second lateral surface. The first external electrode, the second external electrode, and the third external electrode are not provided on a third lateral surface or a fourth lateral surface. The first external electrode and the second external electrode are spaced apart from each other in a first direction on the first lateral surface. The third external electrode provided on the second lateral surface is located between the first external electrode and the second external electrode, when viewed in a second direction.

14 Claims, 11 Drawing Sheets

(56) References Cited

U.S. PATENT DOCUMENTS

| | | | | |
|---|---|---|---|---|
| 8,937,801 B2 * | 1/2015 | Chung | H01G 4/232 | 361/329 |
| 2007/0091532 A1 * | 4/2007 | Yamauchi | H01C 7/18 | 361/118 |
| 2024/0312677 A1 * | 9/2024 | Hattori | H01C 7/12 | |

* cited by examiner

| | Embodiment 1 | Comparative Example |
|---|---|---|
| Perspective view |   |   |
| Electric flux density [C/m²]   |  |  |
| Stray capacitance [pF] | 0.77 | 2.82 |

(a) Capacitance generated between internal electrodes (b) Capacitance generated between internal and external electrodes (c) Capacitance generated between internal electrodes and between internal and external electrodes

| | Embodiment 2 | Comparative Example |
|---|---|---|
| Perspective view |   |   |
| Electric flux density [C/m$^2$]   |  |  |
| Stray capacitance [pF] | 1.13 | 2.82 |

<table>
<tr><td></td><td>Embodiment 3</td><td>Comparative Example</td></tr>
<tr><td>Perspective view</td><td>
</td><td>
</td></tr>
<tr><td>Electric flux density [C/m²]<br>
</td><td></td><td></td></tr>
<tr><td>Stray capacitance [pF]</td><td>2.73</td><td>2.82</td></tr>
</table>

VARISTOR COMPONENT

CROSS-REFERENCE OF RELATED APPLICATIONS

This application is the U.S. National Phase under 35 U.S.C. § 371 of International Patent Application No. PCT/JP2022/004845, filed on Feb. 8, 2022, which in turn claims the benefit of Japanese Patent Application No. 2021-017941, filed on Feb. 8, 2021, the entire disclosures of which Applications are incorporated by reference herein.

TECHNICAL FIELD

The present disclosure relates to a varistor component for use in an electronic device.

BACKGROUND ART

Recently, size reduction of electronic devices has been progressively achieved, and there has also been a demand for size reduction of varistor components provided in electronic devices. Furthermore, compatibility with higher frequencies has been required for electronic devices, and there has been a demand for varistor components having small variations in capacitance. Patent Literature (PTL) 1 discloses a multilayer varistor component that includes two varistor elements, as an example of a varistor component. This varistor component includes a varistor-material sintered body, a plurality of external electrodes, and a plurality of internal electrodes.

CITATION LIST

Patent Literature

[PTL 1] Japanese Unexamined Patent Application Publication No. S63-211602

SUMMARY OF INVENTION

Technical Problem

However, a conventional varistor component has a problem that a stray capacitance is generated by the external electrodes and the internal electrodes. If a stray capacitance is generated, capacitances of two varistor elements, for example, vary, which may affect operation of the electronic device.

In view of the above, the present disclosure is to decrease a stray capacitance generated in a varistor component.

Solution to Problem

A varistor component according to an aspect of the present disclosure is a varistor component that includes a first varistor element and a second varistor element, the varistor component including: a varistor-material sintered body that includes: a bottom surface; a top surface on a side of the varistor-material sintered body opposite from the bottom surface; and a plurality of lateral surfaces that connect the bottom surface and the top surface; a first external electrode that is a terminal at one end of the first varistor element and is provided on a portion of a first lateral surface included in the plurality of lateral surfaces; a second external electrode that is a terminal at one end of the second varistor element and is provided on a portion of the first lateral surface; and a third external electrode that is a common terminal at another end of the first varistor element and another end of the second varistor element, and is provided on a portion of a second lateral surface on a side of the varistor-material sintered body opposite from the first lateral surface, the second lateral surface being included in the plurality of lateral surfaces. The plurality of lateral surfaces further include a third lateral surface and a fourth lateral surface, the third lateral surface being orthogonal to both of the first lateral surface and the bottom surface, the fourth lateral surface being on a side of the varistor-material sintered body opposite from the third lateral surface. The first external electrode, the second external electrode, and the third external electrode are not provided on the third lateral surface or the fourth lateral surface. The first external electrode and the second external electrode are spaced apart from each other in a first direction on the first lateral surface, the first direction being a direction in which the third lateral surface and the fourth lateral surface are directed. The third external electrode provided on the portion of the second lateral surface is located between the first external electrode and the second external electrode, when the third external electrode is viewed in a second direction, the second direction being a direction in which the first lateral surface and the second lateral surface are directed.

Advantageous Effects of Invention

According to the present disclosure, a stray capacitance generated in a varistor component can be decreased.

DESCRIPTION OF EMBODIMENTS

[Circumstances Leading to the Present Disclosure]

Figure 1:
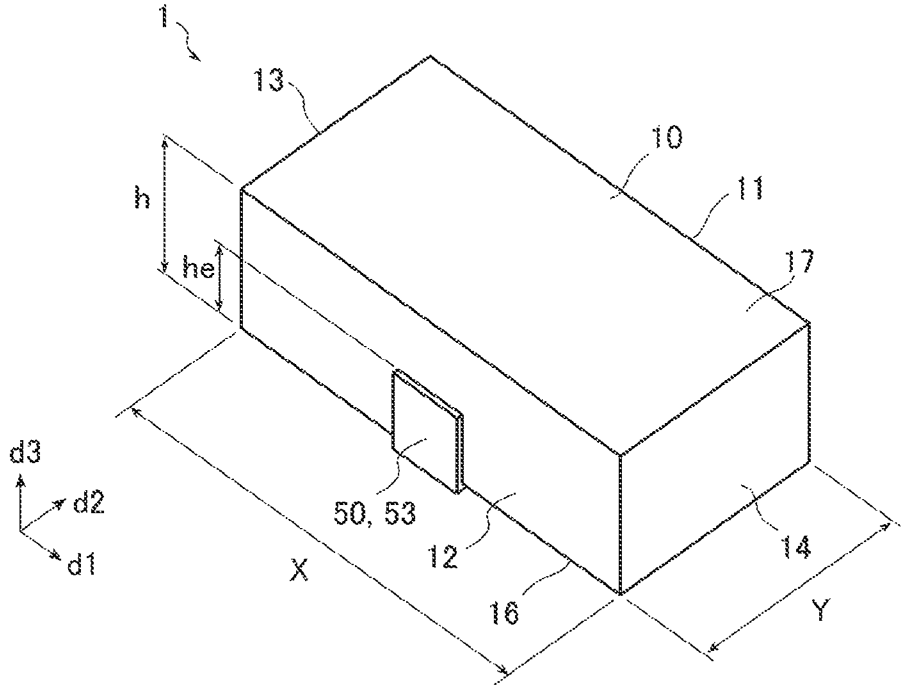
FIG. 1 is a perspective view of a varistor component according to Embodiment 1.

A varistor element has a resistance that changes according to an applied voltage, and is used to protect an electronic device from an abnormal voltage such as lightning surge or static electricity. A varistor element is used in an electrical circuit in an automobile, office automation equipment, a communication device, or a home appliance, for example.

For example, in order to be compatible with two-wire differential communication in a communication network, an electronic device may be provided with two varistor components each including a single varistor element or a varistor element that includes two varistor elements. These varistor components each include a varistor-material sintered body, a plurality of external electrodes, and a plurality of internal electrodes. For example, if an unintended capacitance, that is, a stray capacitance is generated between an external electrode and an internal electrode of a varistor component or between external electrodes thereof or between internal electrodes thereof, the capacitance values of two varistor elements become different, and thus a communication error may occur in an electronic device. In view of this, in the present embodiment, a varistor component has a configuration as shown below in order to decrease a stray capacitance generated in the varistor component.

The following specifically describes embodiments, with reference to the drawings.

Note that the embodiments described below each show a general or specific example of the present disclosure. The numerical values, shapes, materials, elements, the arrangement and connection of the elements, steps, and the processing order of the steps, for instance, stated in the following embodiments are mere examples and therefore, are not intended to limit the present disclosure. Out of the elements in the following embodiments, elements not recited in any independent claim are described as optional elements.

In the Specification, a term that indicates a relation between elements such as parallel, a term that indicates the shape of an element such as rectangular parallelopiped, and a numerical range do not necessarily have only strict meanings, and also cover substantially equivalent ranges that include a difference of about several percent, for example.

The drawings are schematic diagrams to which emphasis, omission, and ratio adjustment have been appropriately added in order to illustrate the present disclosure, and thus do not necessarily give strict illustration. Accordingly, the drawings may show shapes, positional relations, and proportions that are different from actual ones. Throughout the drawings, the same numeral is given to substantially the same element, and redundant description may be omitted or simplified.

Moreover, in the Specification, the terms "top surface" and "bottom surface" in a configuration of a varistor component do not indicate a top surface (a vertically upper surface) or a bottom surface (a vertically lower surface) in absolute space recognition, and are used as terms that are defined by a relative positional relation between elements of a varistor component.

Embodiment 1

[Configuration of Varistor Component]

A configuration of a varistor component according to Embodiment 1 is to be described with reference to FIG. 1 to FIG. 5.

Figure 2:
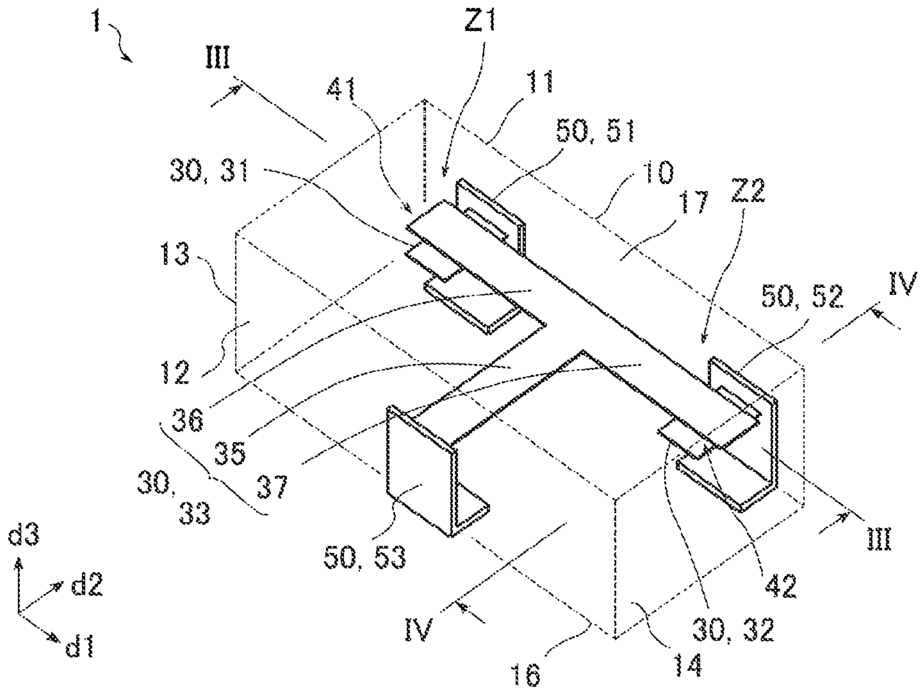
FIG. 2 illustrates external electrodes and internal electrodes included in the varistor component according to Embodiment 1.
Figure 3:
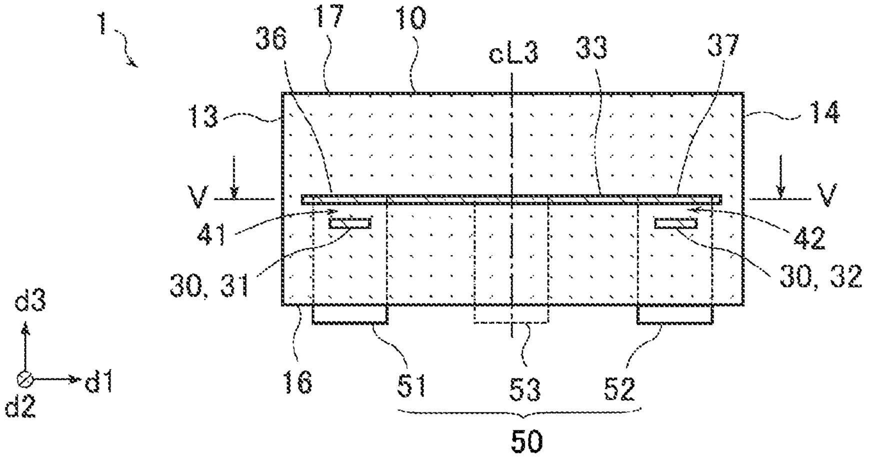
FIG. 3 is a cross sectional view of the varistor component according to Embodiment 1 from the front thereof.
Figure 4:
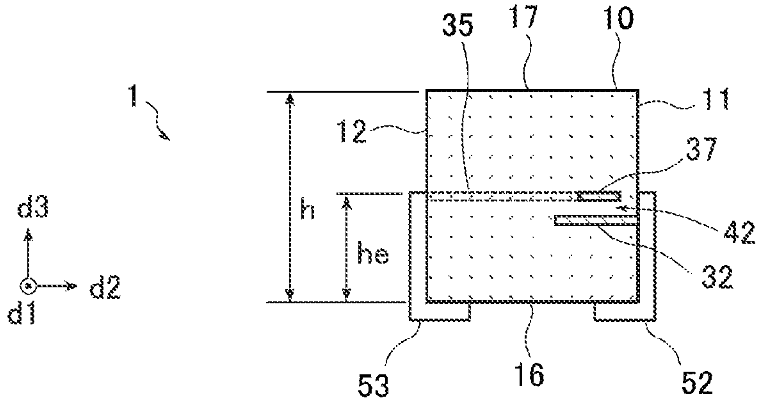
FIG. 4 is a cross sectional view of the varistor component according to Embodiment 1 from the side thereof.
Figure 5:
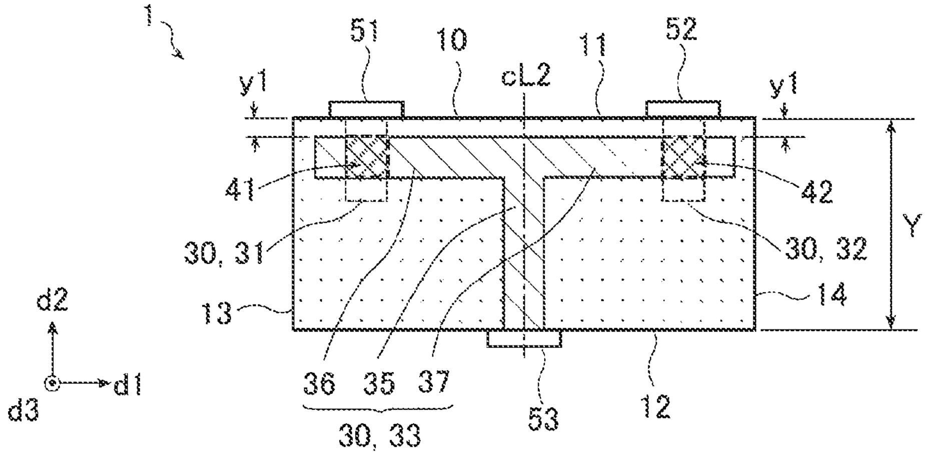
FIG. 5 is a cross sectional view of the varistor component according to Embodiment 1 from the top thereof.

FIG. 1 is a perspective view of varistor component 1 according to Embodiment 1. FIG. 2 illustrates external electrodes 50 and internal electrodes 30 included in varistor component 1. FIG. 3 is a cross sectional view of varistor component 1 from the front thereof. FIG. 4 is a cross sectional view of varistor component 1 from the side thereof. FIG. 5 is a cross sectional view of varistor component 1 from the top thereof.

Note that FIG. 3 is a view of varistor component 1 from line III-III illustrated in FIG. 2, FIG. 4 is a view of varistor component 1 from line IV-IV illustrated in FIG. 2, and FIG. 5 is a view of varistor component 1 from line V-V illustrated in FIG. 3. In FIG. 3 to FIG. 5, hatching for external electrodes 50 is omitted.

Varistor component 1 includes first varistor element Z1 and second varistor element Z2. As illustrated in FIG. 1 and FIG. 2, first varistor element Z1 and second varistor element Z2 are configured of varistor-material sintered body 10, external electrodes 50 provided on the outside of varistor-material sintered body 10, and internal electrodes 30 provided inside of varistor-material sintered body 10.

Varistor-material sintered body 10 includes ZnO as a principal component, and includes, as accessory components, $Bi_2O_3$, $Co_2O_3$, $MnO_2$, and $Sb_2O_3$, for instance, or $Pr_6O_{11}$, $Co_2O_3$, $CaCO_3$, and $Cr_2O_3$, for instance. Varistor-material sintered body 10 is obtained by ZnO being sintered and other accessory components being deposited at grain boundaries thereof.

Varistor-material sintered body 10 is a rectangular parallelepiped, and includes bottom surface 16, top surface 17 on an opposite side thereof from bottom surface 16, and lateral surfaces that connect bottom surface 16 and top surface 17. Bottom surface 16, top surface 17, and the lateral surfaces are all planar. The lateral surfaces include first lateral surface 11, second lateral surface 12 on a side of varistor-material sintered body 10 opposite from first lateral surface 11, third lateral surface 13 orthogonal to both first lateral surface 11 and bottom surface 16, and fourth lateral surface 14 on a side of varistor-material sintered body 10 opposite from third lateral surface 13. Bottom surface 16 and top surface 17 are parallel to each other, first lateral surface 11 and second lateral surface 12 are parallel to each other, and third lateral surface 13 and fourth lateral surface 14 are parallel to each other. Corner portions (ridge portions) of varistor-material sintered body 10 at which the surfaces meet may be round.

Here, a direction in which third lateral surface 13 and fourth lateral surface 14 are directed is referred to as first direction d1, a direction in which first lateral surface 11 and second lateral surface 12 are directed is referred to as second direction d2, and a direction in which bottom surface 16 and top surface 17 are directed is referred to as third direction d3.

In varistor-material sintered body 10, length X in first direction d1 and width Y in second direction d2 have a relation of X>Y, for example. In the present embodiment, X=1.6 mm, and Y=0.8 mm. Note that height h in third direction d3 satisfies h=0.6 mm.

External electrodes 50 include first external electrode 51, second external electrode 52, and third external electrode 53. First external electrode 51 is a terminal at one end of first varistor element Z1, and is provided on a portion of first lateral surface 11. Second external electrode 52 is a terminal at one end of second varistor element Z2, and is provided on a portion of first lateral surface 11. Third external electrode 53 is a common terminal at another end of first varistor element Z1 and another end of second varistor element Z2, and is provided on a portion of second lateral surface 12. For example, first external electrode 51 and second external electrode 52 are connected to different signal wires, and third external electrode 53 is connected to the ground.

Note that first external electrode 51, second external electrode 52, and third external electrode 53 are not provided on any of top surface 17, third lateral surface 13, or fourth lateral surface 14. First external electrode 51 and second external electrode 52 are not provided on second lateral surface 12, and third external electrode 53 is not provided on first lateral surface 11.

First external electrode 51 and second external electrode 52 are spaced apart from each other in first direction d1 on first lateral surface 11. Third external electrode 53 provided on second lateral surface 12 is located between first external electrode 51 and second external electrode 52 when viewed in second direction d2 (refer to FIG. 3). More specifically, third external electrode 53 is located in the middle between first external electrode 51 and second external electrode 52 when viewed in second direction d2.

In addition, first external electrode 51, second external electrode 52, and third external electrode 53 are each provided on a portion of bottom surface 16. A portion of first external electrode 51 provided on bottom surface 16 is connected to a portion of first external electrode 51 provided on first lateral surface 11. A portion of second external electrode 52 provided on bottom surface 16 is connected to a portion of second external electrode 52 provided on first lateral surface 11. A portion of third external electrode 53 provided on bottom surface 16 is connected to a portion of third external electrode 53 provided on second lateral surface 12. Thus, external electrodes 50 are each L-shaped when viewed in first direction d1 (refer to FIG. 2 and FIG. 4).

First external electrode 51, second external electrode 52, and third external electrode 53 extend from bottom surface 16 toward top surface 17, but stop extending before reaching top surface 17. Heights he of first external electrode 51, second external electrode 52, and third external electrode 53 that extend from bottom surface 16 toward top surface 17 are each at least half and lower than height h of varistor-material sintered body 10, for example. Note that heights he of first external electrode 51, second external electrode 52, and third external electrode 53 are not necessarily the same.

Internal electrodes 30 include first internal electrode 31, second internal electrode 32, and third internal electrode 33. First internal electrode 31 is connected to first external electrode 51 at first lateral surface 11. Second internal electrode 32 is connected to second external electrode 52 at first lateral surface 11. Third internal electrode 33 is connected to third external electrode 53 at second lateral surface 12.

A varistor component is a multilayer component acquired by stacking ceramic layers and ceramic layers each with one or more internal electrodes in third direction d3 and thereafter providing external electrodes. First internal electrode 31 and second internal electrode 32 are provided on the same ceramic layer, whereas third internal electrode 33 is provided on a ceramic layer different from the ceramic layer on which first internal electrode 31 and second internal electrode 32 are provided. Third internal electrode 33 in the present embodiment is provided closer to top surface 17 than first internal electrode 31 and second internal electrode 32 are thereto. In other words, first internal electrode 31 and second internal electrode 32 are provided closer to bottom surface 16 than third internal electrode 33 is thereto.

Note that first internal electrode 31 may be provided between first counter electrode portion 36 that is a portion of third internal electrode 33 and the portion of first external electrode 51 provided on bottom surface 16. Second internal electrode 32 may be provided between second counter electrode portion 37 that is a portion of third internal electrode 33 and the portion of second external electrode 52 provided on bottom surface 16 (refer to FIG. 4).

First internal electrode 31 and second internal electrode 32 are each rectangular when viewed in third direction d3, and are each provided in second direction d2 (refer to FIG. 5). First internal electrode 31 and second internal electrode 32 each extend from first lateral surface 11 toward second lateral surface 12, and stop extending before reaching second lateral surface 12.

Third internal electrode 33 is T-shaped when viewed in third direction d3. Third internal electrode 33 includes extraction electrode portion 35, first counter electrode portion 36, and second counter electrode portion 37. Note that third internal electrode 33 may be Y-shaped or have a + shape (be plus sign-shaped) when viewed in third direction d3.

Extraction electrode portion 35 is rectangular, and provided in second direction d2. Extraction electrode portion 35 extends from second lateral surface 12 toward first lateral surface 11, and stops extending before reaching first lateral surface 11. First counter electrode portion 36 and second counter electrode portion 37 are connected to an end portion of extraction electrode portion 35 closer to first lateral surface 11, and are provided in first direction d1. First counter electrode portion 36 extends toward third lateral surface 13, and stops extending before reaching third lateral surface 13. Second counter electrode portion 37 extends toward fourth lateral surface 14, and stops extending before reaching fourth lateral surface 14. When viewed in third direction d3, first counter electrode portion 36 crosses first internal electrode 31, and second counter electrode portion 37 crosses second internal electrode 32.

Varistor component 1 includes first facing region 41 in which first internal electrode 31 and third internal electrode 33 face each other, and second facing region 42 in which second internal electrode 32 and third internal electrode 33 face each other (refer to FIG. 3 and FIG. 5). First facing region 41 and second facing region 42 each have a structure in which a pair of internal electrodes face each other with the varistor sintered material being provided therebetween, and are regions that exhibit functions as a varistor. First facing region 41 is acquired by a portion of first internal electrode 31 and a portion of first counter electrode portion 36 facing each other, and second facing region 42 is acquired by a portion of second internal electrode 32 and a portion of second counter electrode portion 37 facing each other.

A space (gap) between first internal electrode 31 and third internal electrode 33 in first facing region 41 is the same as a space (gap) between second internal electrode 32 and third internal electrode 33 in second facing region 42. The above space is 0.035 mm, for example.

First facing region 41 and second facing region 42 are located closer to first lateral surface 11 than to second lateral surface 12 when viewed in third direction d3 (refer to FIG. 5). For example, when the width of varistor-material sintered body 10 in second direction d2 is Y and first lateral surface 11 is assumed to be a reference, first facing region 41 and second facing region 42 are provided in positions at which the entireties thereof lie within a portion of varistor-material sintered body 10 that has a width greater than 0 and shorter than 0.5 Y from the reference. Note that shortest distance y1 between first lateral surface 11 and an edge portion of first facing region 41 and shortest distance y1 between first lateral surface 11 and an edge portion of second facing region 42 may be greater than the above space (gap).

First internal electrode 31, second internal electrode 32, and third internal electrode 33 are provided line-symmetrically with respect to central line cL2 passing through a middle position between first external electrode 51 and second external electrode 52 and extending in second direction d2 (refer to FIG. 5). Accordingly, a difference in stray capacitance generated in first varistor element Z1 and second varistor element Z2 can be decreased. Note that central line cL2 may match the central line of varistor component 1 when viewed in third direction d3.

First internal electrode 31, second internal electrode 32, and third internal electrode 33 are provided line-symmetrically with respect to central line cL3 passing through a middle position between first external electrode 51 and second external electrode 52 and extending in third direction d3 (refer to FIG. 3). Accordingly, a difference in stray capacitance generated in first varistor element Z1 and second varistor element Z2 can be decreased. Note that central line cL3 may match the central line of varistor component 1 when viewed in second direction d2.

Advantageous Effects and Others

Advantageous effects yielded by varistor component 1 having the above configuration are to be described in comparison with a comparative example, for instance.

Figure 6:
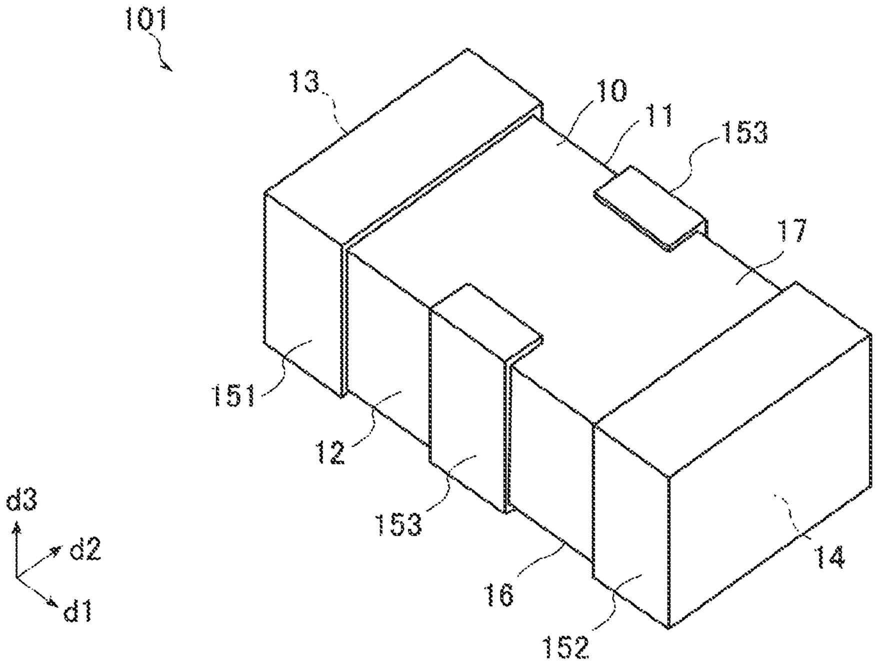
FIG. 6 is a perspective view of a varistor component according to a comparative example.

FIG. 6 is a perspective view of varistor component 101 according to a comparative example.

Varistor component 101 according to the comparative example also includes external electrodes at two end portions of varistor-material sintered body 10 in a rectangular parallelepiped shape. Specifically, first external electrode 151 is provided on entire third lateral surface 13, a portion of first lateral surface 11, a portion of second lateral surface 12, a portion of bottom surface 16, and a portion of top surface 17. Second external electrode 152 is provided on entire fourth lateral surface 14, a portion of first lateral surface 11, a portion of second lateral surface 12, a portion of bottom surface 16, and a portion of top surface 17. In addition, third external electrode 153 is provided on a portion of second lateral surface 12, a portion of bottom surface 16, a portion of first lateral surface 11, and a portion of top surface 17.

Figure 7:
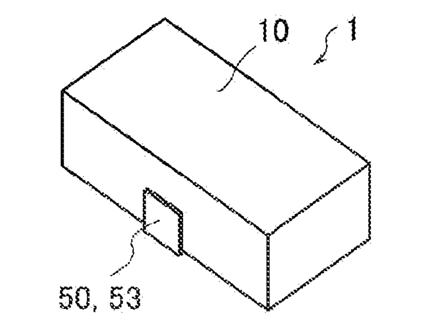
FIG. 7 illustrates electric flux densities and stray capacitances generated in the varistor components according to Embodiment 1 and the comparative example.
Figure 7:
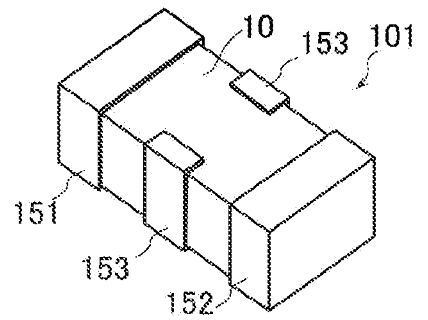
Figure 7:
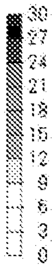
Figure 7:
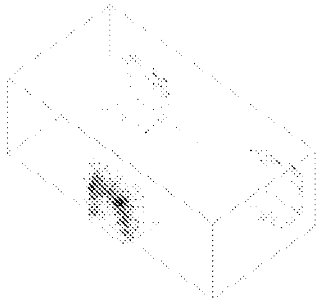
Figure 7:
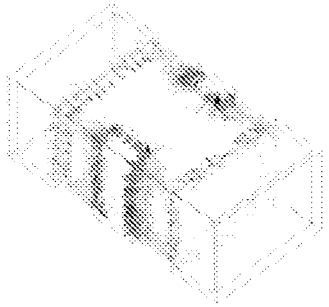

FIG. 7 illustrates electric flux densities and stray capacitances generated in the varistor components according to Embodiment 1 and the comparative example. The drawing illustrates electric flux densities and stray capacitances when a voltage of 1 V is applied to the first external electrodes and the second external electrodes of the varistor components and a voltage of 0 V is applied to the third external electrodes thereof. Note that the drawing shows results of simulations without including the internal electrodes.

In FIG. 7, when second lateral surface 12, for example, is focused on, in the comparative example, a portion where an electric flux density is high appears between first external electrode 151 and third external electrode 153, and a portion where an electric flux density is high appears between second external electrode 152 and third external electrode 153. The tendency for such a portion where an electric flux density is high to appear is similar for first lateral surface 11 and top surface 17. In the comparative example, external electrodes having different potentials are provided on each of first lateral surface 11 and second lateral surface 12 and furthermore, external electrodes having different potentials are provided also on top surface 17, and thus when varistor component 101 is viewed as a whole, many portions where an electric flux density is high are included, so that the stray capacitance increases.

In contrast, in Embodiment 1, although a portion where an electric flux density is high appears in the vicinity of third external electrode 53 provided on second lateral surface 12, such a portion where an electric flux density is high is less than that in the comparative example. In Embodiment 1, external electrodes 50 having different potentials are provided so as not to be adjacent to one another on the lateral surfaces or top surface 17. Accordingly, when varistor component 1 is viewed as a whole, a portion where an electric flux density is high is less than that in the comparative example, and also a stray capacitance is smaller than that in the comparative example.

In this manner, in varistor component 1 according to Embodiment 1, first external electrode 51, second external electrode 52, and third external electrode 53 are not provided on any of top surface 17, third lateral surface 13, or fourth lateral surface 14. Further, on second lateral surface 12, only third external electrode 53 is provided, and first external electrode 51 and second external electrode 52 are not provided. Moreover, on first lateral surface 11, only first external electrode 51 and second external electrode 52 are provided, and third external electrode 53 is not provided. Accordingly, in varistor component 1, a portion where an electric flux density is high is reduced, and a stray capacitance can be decreased.

Figure 8:
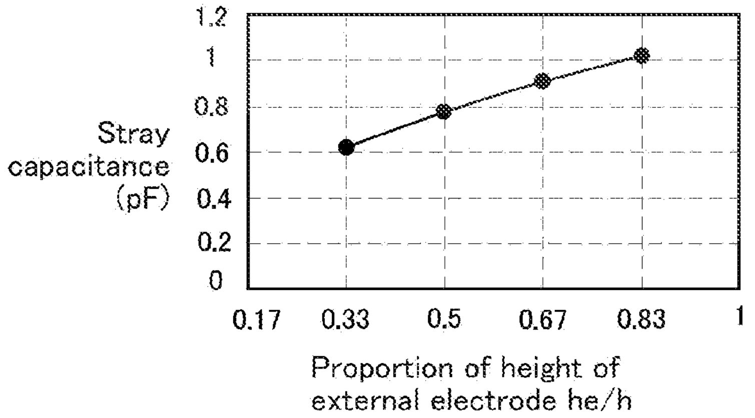
FIG. 8 is a graph showing a relation between a stray capacitance and the height of the external electrodes in the varistor component according to Embodiment 1.

FIG. 8 is a graph showing a relation between a stray capacitance and the height of external electrodes 50 in varistor component 1 according to Embodiment 1. The horizontal axis in the drawing indicates a proportion of the height of external electrodes 50, whereas the vertical axis indicates a stray capacitance generated in varistor component 1. Note that as a stray capacitance, results obtained through simulations without including the internal electrodes are shown. Height h of varistor-material sintered body 10 is 0.6 mm, and height he of external electrodes 50 is the same for first external electrode 51, second external electrode 52, and third external electrode 53.

As illustrated in FIG. 8, a stray capacitance generated in varistor component 1 is smaller as height he of external electrodes 50 is lower. Accordingly, in varistor component 1, height he of external electrodes 50 may be at least half and lower than height h of varistor-material sintered body 10. Note that a reason for $he \geq 0.5h$ is that reliability of connection when varistor component 1 is mounted on a printed board, for instance, decreases if $he < 0.5$ h.

In this manner, in varistor component 1 according to Embodiment 1, height he of each of first external electrode 51, second external electrode 52, and third external electrode 53 is set to a height that is at least half and lower than the height of varistor-material sintered body 10. Accordingly, a stray capacitance generated in varistor component 1 can be decreased.

Figure 9:
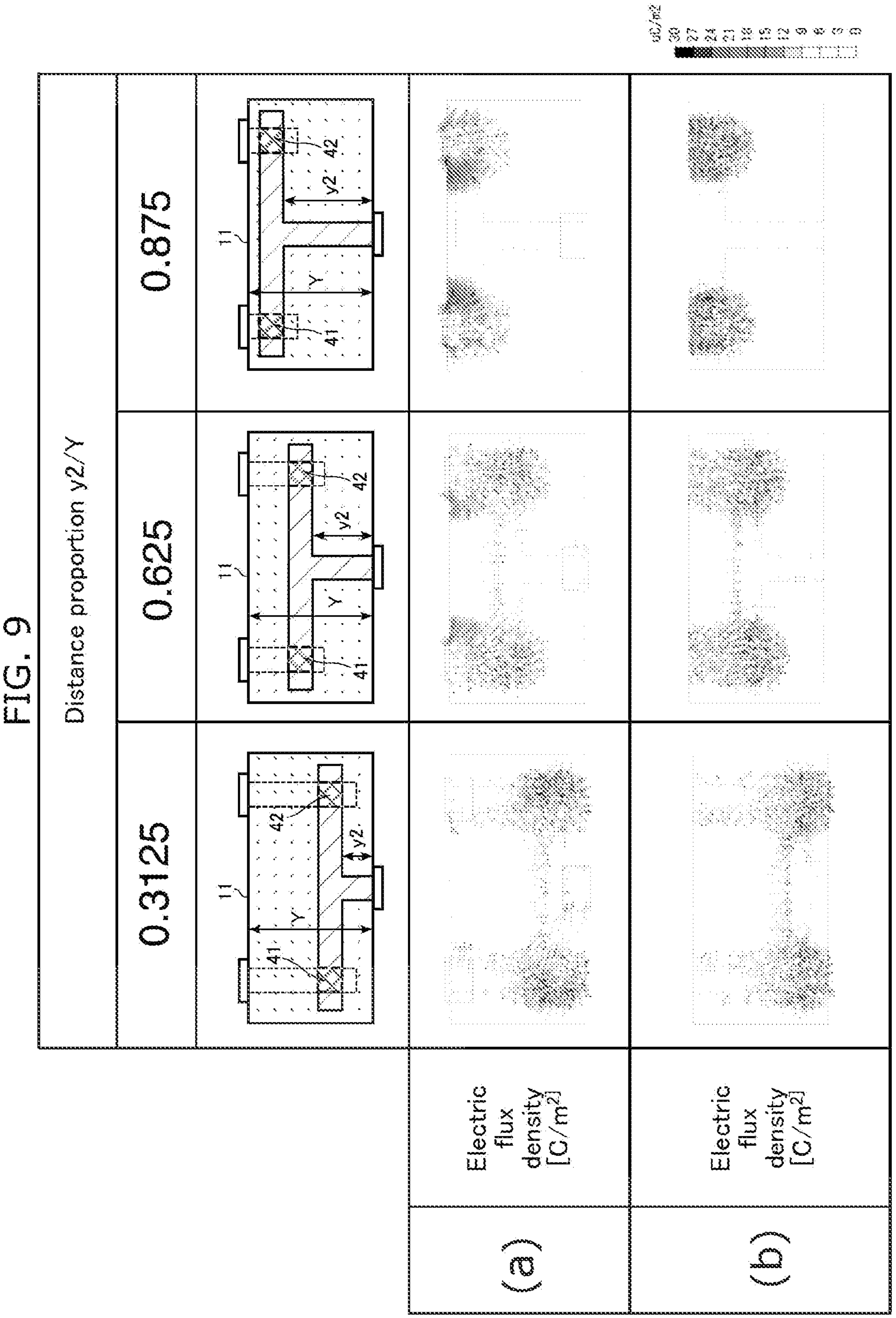
FIG. 9 illustrates views from a top surface showing electric flux densities generated in the varistor component according to embodiment 1.

FIG. 9 illustrates views from top surface 17 showing electric flux densities generated in varistor component 1 according to Embodiment 1. Part (a) of FIG. 9 shows results of simulations of varistor component 1 that includes external electrodes 50 and internal electrodes 30, whereas (b) of FIG. 9 shows results of simulations in a state in which external electrodes 50 are excluded from varistor component 1.

FIG. 9 illustrates electric flux densities when a voltage of 1 V is applied to first internal electrode 31 and second internal electrode 32 of varistor component 1 and a voltage of 0 V is applied to third internal electrode 33. In FIG. 9, electric flux densities that appear in first facing region 41 and second facing region 42 are for generating capacitance necessary for varistor component 1, and electric flux densities that appear in regions other than first facing region 41 and second facing region 42 are densities of electric flux that can generate stray capacitance.

FIG. 9 illustrates three examples in which positions of first facing region 41 and second facing region 42 are changed in second direction d2. In the three examples, a difference between positions of first facing region 41 and second facing region 42 is represented by distance proportion y2/Y when the width of varistor-material sintered body 10 in second direction d2 is denoted by Y and a distance from second lateral surface 12 to an edge portion of first counter electrode portion 36 (or second counter electrode portion 37) closer to second lateral surface 12 is denoted by y2. The positions of first facing region 41 and second facing region 42 are changed by changing the lengths of first internal electrode 31 and second internal electrode 32 in second direction d2 and furthermore, changing the length of extraction electrode portion 35 and moving first counter electrode portion 36 and second counter electrode portion 37 in second direction d2.

As illustrated in FIG. 9, portions where an electric flux density that can cause a stray capacitance decrease with an increase in above-described distance proportion y2/Y in the order of 0.3125, 0.625, and 0.875. Accordingly, in varistor component 1, first facing region 41 and second facing region 42 may be located closer to first lateral surface 11 than to second lateral surface 12. In varistor component 1, for example, distance proportion y2/Y may be designed to be greater than 0.5. In this manner, since first facing region 41 and second facing region 42 are provided closer to first lateral surface 11, portions where an electric flux density is high can be decreased, and a stray capacitance generated in varistor component 1 can be decreased.

Variation 1 of Embodiment 1

Varistor component 1A according to Variation 1 of Embodiment 1 is to be described. In Variation 1, an example is to be described in which third internal electrode 33 is provided closer to bottom surface 16 than first internal electrode 31 and second internal electrode 32 are thereto.

Figure 10:
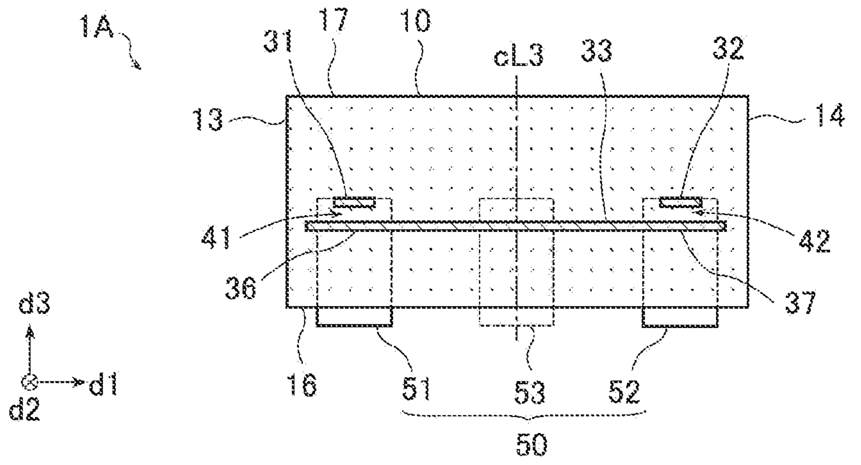
FIG. 10 is a cross sectional view of a varistor component according to Variation 1 of Embodiment 1 from the front thereof.
Figure 11:
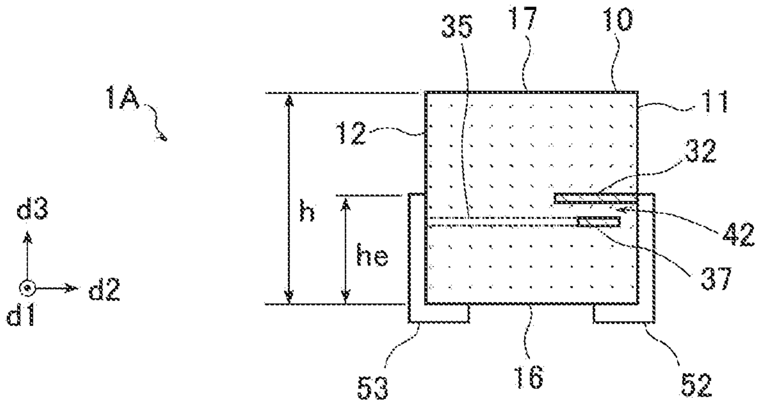
FIG. 11 is a cross sectional view of the varistor component according to Variation 1 of Embodiment 1 from the side thereof.

FIG. 10 is a cross sectional view of varistor component 1A according to Variation 1 of Embodiment 1 from the front thereof. FIG. 11 is a cross sectional view of varistor component 1A according to Variation 1 from the side thereof.

Varistor component 1A according to Variation 1 also includes varistor-material sintered body 10, external electrodes 50, and internal electrodes 30. Configurations of varistor-material sintered body 10 and external electrodes 50 are the same as those in Embodiment 1.

Internal electrodes 30 include first internal electrode 31, second internal electrode 32, and third internal electrode 33.

As illustrated in FIG. 10 and FIG. 11, in varistor component 1A according to Variation 1, third internal electrode 33 is provided closer to bottom surface 16 than first internal electrode 31 and second internal electrode 32 are thereto. In other words, first internal electrode 31 and second internal electrode 32 are provided closer to top surface 17 than third internal electrode 33 is thereto.

Note that first counter electrode portion 36 that is a portion of third internal electrode 33 may be provided between first internal electrode 31 and a portion of first external electrode 51 provided on bottom surface 16. Second counter electrode portion 37 that is a portion of third internal electrode 33 may be provided between second internal electrode 32 and a portion of second external electrode 52 provided on bottom surface 16 (refer to FIG. 11).

Next, effects with regard to varistor component 1A according to Variation 1 are to be described.

Figure 12:
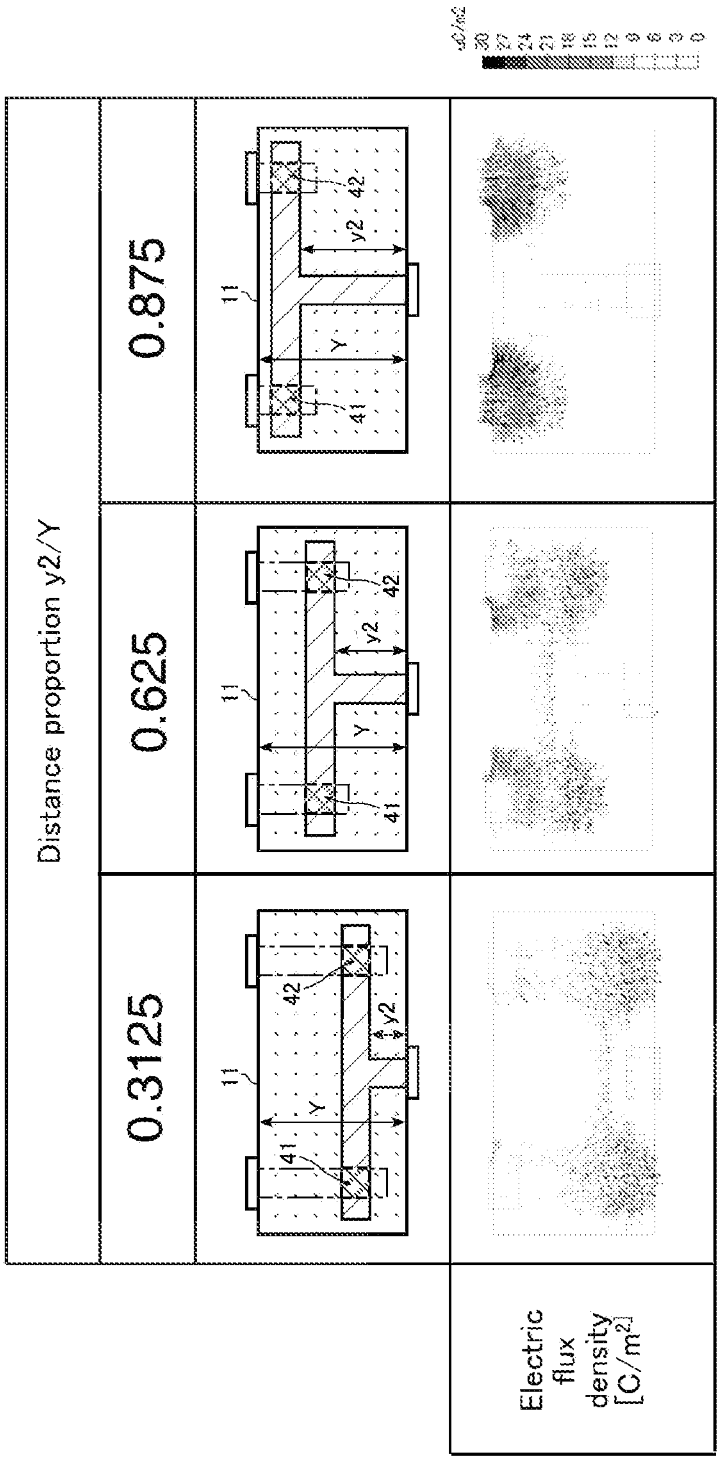
FIG. 12 illustrates views from a top surface showing electric flux densities generated in the varistor component according to Variation 1 of Embodiment 1.

FIG. 12 illustrates views from top surface 17 showing electric flux densities generated in varistor component 1A according to Variation 1. FIG. 12 illustrates first internal electrode 31 and second internal electrode 32 located closer to top surface 17 than third internal electrode 33 is thereto, with dash-dot lines. The drawing shows results of simulations conducted under the same setting conditions as those in FIG. 9.

As illustrated in FIG. 12, also in Variation 1, portions where an electric flux density that can cause a stray capacitance is high decrease with an increase in distance proportion y2/Y in the order 0.3125, 0.625, and 0.875, similarly to Embodiment 1. Accordingly, also in varistor component 1A, first facing region 41 and second facing region 42 may be located closer to first lateral surface 11 than to second lateral surface 12.

Also in Variation 1, a stray capacitance generated in varistor component 1A can be decreased, similarly to Embodiment 1.

Next, the varistor components according to Embodiment 1 and Variation 1 are to be described in comparison.

Figure 13:
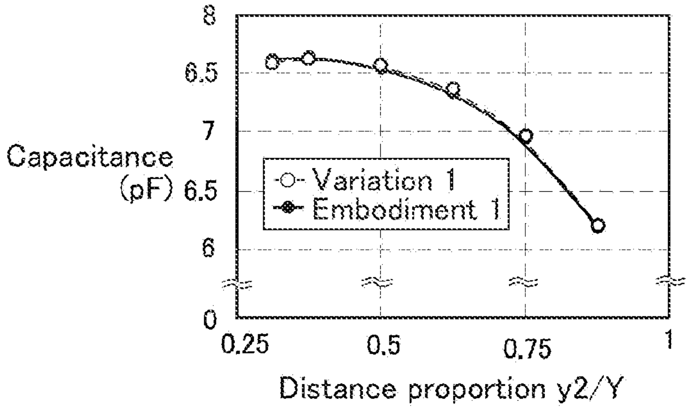
FIG. 13 illustrates graphs showing, for instance, capacitances generated in the varistor components according to Embodiment 1 and Variation 1.
Figure 13:
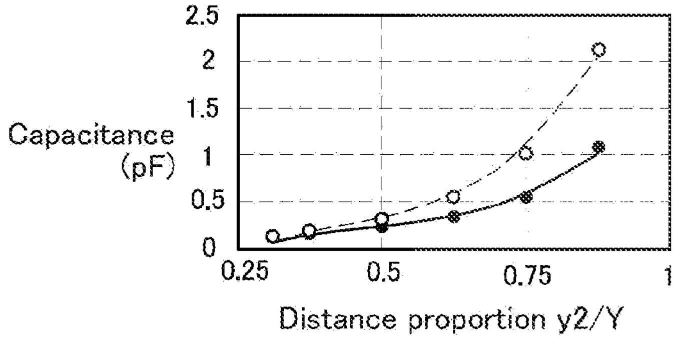
Figure 13:
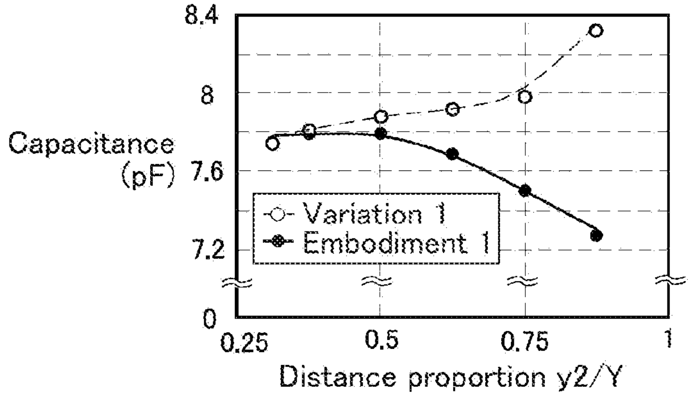

FIG. 13 illustrates graphs showing, for instance, capacitances generated in the varistor components according to Embodiment 1 and Variation 1. Part (a) of FIG. 13 illustrates a capacitance generated between internal electrodes 30 in a state in which external electrodes 50 are excluded from the varistor components. Part (b) of FIG. 13 illustrates a capacitance (that is, a stray capacitance) generated between internal electrode 30 and external electrode 50. Part (c) of FIG. 13 illustrates a capacitance generated between internal electrodes 30 and between internal electrode 30 and external electrode 50. Part (c) of FIG. 13 illustrates results of combining data in (a) and (b) of FIG. 13. The horizontal axis in each of the graphs indicates above-described distance proportion y2/Y, whereas the vertical axis indicates capacitance.

As illustrated in (a) of FIG. 13, if only internal electrodes 30 are to be focused on, a gap between internal electrodes 30 and the area in which internal electrodes 30 face each other are the same in Embodiment 1 and Variation 1, and thus changes in capacitance in Embodiment 1 and Variation 1 exhibit the same tendency. In contrast, as illustrated in (b) of FIG. 13, a capacitance, that is, a stray capacitance generated between external electrode 50 and internal electrode 30 tends to be higher in Variation 1 than in Embodiment 1. Accordingly, as illustrated in (c) of FIG. 13, a capacitance resulting from being combined exhibits a different tendency for Variation 1 and Embodiment 1.

A conceivable reason therefor is that in Variation 1, a structure in which third internal electrode 33 and first external electrode 51 having different potentials directly face each other, and a stray capacitance is readily generated between third internal electrode 33 and first external electrode 51. But nevertheless, Embodiment 1 adopts a structure in which third internal electrode 33 and first external electrode 51 having different potentials face each other with first internal electrode 31 being provided therebetween, and thus a stray capacitance is not readily generated between third internal electrode 33 and first external electrode 51.

Accordingly, in varistor components, third internal electrode 33 may be located closer to top surface 17 than first internal electrode 31 and second internal electrode 32 are thereto, as in Embodiment 1. Note that even the configuration stated in Variation 1 can sufficiently achieve an object of decreasing a stray capacitance.

Variation 2 of Embodiment 1

Varistor component 1B according to Variation 2 of Embodiment 1 is to be described. In Variation 2, an example in which third internal electrode 33 is in a shape different from that in Embodiment 1 is to be described.

Figure 14:
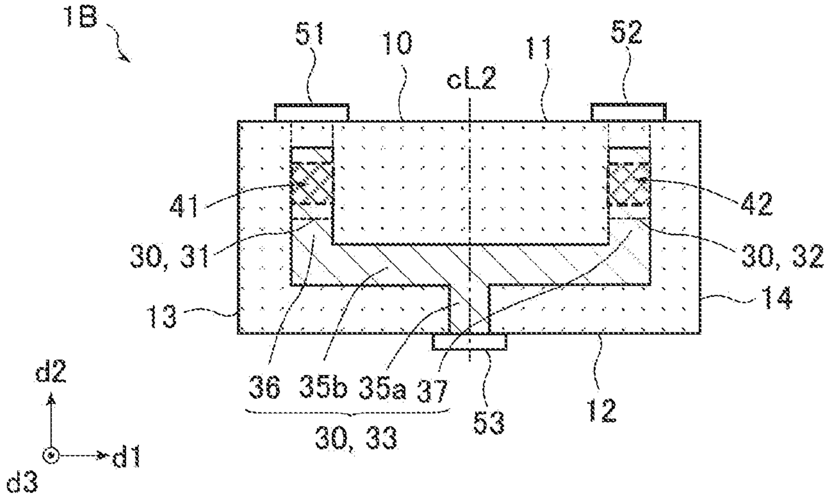
FIG. 14 is a cross sectional view of a varistor component according to Variation 2 of Embodiment 1 from a top surface.

FIG. 14 is a cross sectional view of varistor component 1B according to Variation 2 of Embodiment 1 from top surface 17.

Varistor component 1B according to Variation 2 also includes varistor-material sintered body 10, external electrodes 50, and internal electrodes 30. Configurations of varistor-material sintered body 10 and external electrodes 50 are the same as those in Embodiment 1.

Internal electrodes 30 include first internal electrode 31, second internal electrode 32, and third internal electrode 33.

First internal electrode 31 and second internal electrode 32 are each rectangular when viewed in third direction d3, and are each provided in second direction d2.

As illustrated in FIG. 14, third internal electrode 33 includes first extraction electrode portion 35*a*, second extraction electrode portion 35*b*, first counter electrode portion 36, and second counter electrode portion 37.

First extraction electrode portion 35*a* is rectangular, and provided in second direction d2. First extraction electrode portion 35*a* extends from second lateral surface 12 toward first lateral surface 11, and stops extending before reaching first lateral surface 11. Second extraction electrode portion 35*b* is connected to an end portion of first extraction electrode portion 35*a* closer to first lateral surface 11, and provided in first direction d1. A portion of second extraction electrode portion 35*b* extends toward third lateral surface 13, and stops extending before reaching third lateral surface 13. Another portion of second extraction electrode portion 35*b* extends toward fourth lateral surface 14, and stops extending before reaching fourth lateral surface 14.

First counter electrode portion 36 is connected to an end portion of second extraction electrode portion 35*b* closer to third lateral surface 13, and is provided in second direction d2. First counter electrode portion 36 extends toward first lateral surface 11, and stops extending before reaching first lateral surface 11. Second counter electrode portion 37 is connected to an end portion of second extraction electrode portion 35*b* closer to fourth lateral surface 14, and is provided in second direction d2. Second counter electrode portion 37 extends toward first lateral surface 11, and stops extending before reaching first lateral surface 11. When viewed in third direction d3, first counter electrode portion 36 overlaps first internal electrode 31, and second counter electrode portion 37 overlaps second internal electrode 32.

Varistor component 1B includes first facing region 41 in which first internal electrode 31 and third internal electrode 33 face each other, and second facing region 42 in which second internal electrode 32 and third internal electrode 33 face each other. Also in Variation 2, first facing region 41 is acquired by a portion of first internal electrode 31 and a portion of first counter electrode portion 36 facing each other, and second facing region 42 is acquired by a portion of second internal electrode 32 and a portion of second counter electrode portion 37 facing each other.

Also in Variation 2, similarly to Embodiment 1, a stray capacitance generated in varistor component 1B can be decreased.

Embodiment 2

Varistor component 1C according to Embodiment 2 is to be described. In Embodiment 2, an example in which the heights of external electrodes 50 are the same as the height of varistor-material sintered body 10 is to be described.

Figure 15:
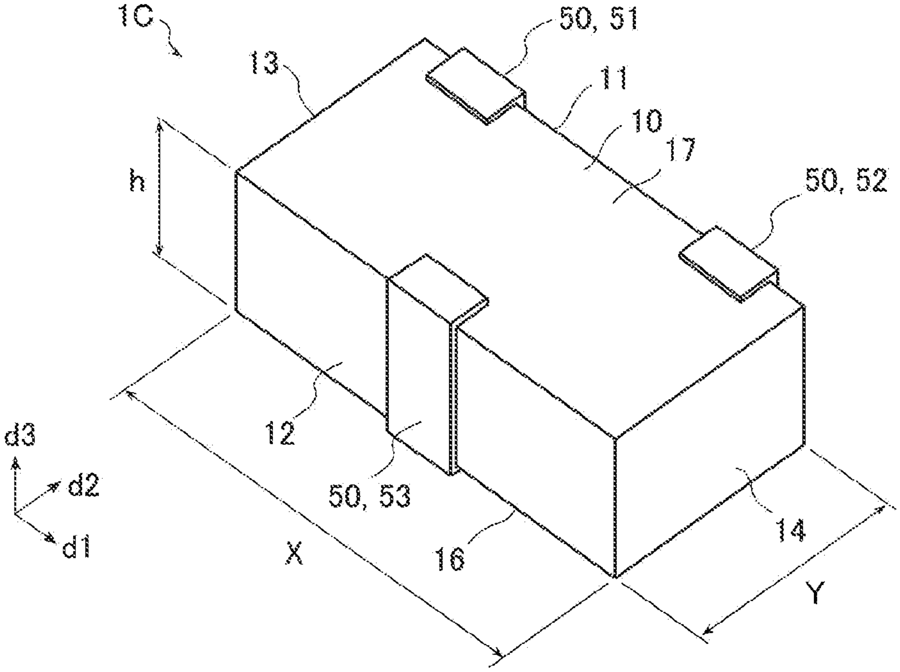
FIG. 15 is a perspective view of a varistor component according to Embodiment 2.

FIG. 15 is a perspective view of varistor component 1C according to Embodiment 2.

Varistor component 1C according to Embodiment 2 also includes varistor-material sintered body 10, external electrodes 50, and internal electrodes 30. Configurations of varistor-material sintered body 10 and internal electrodes 30 are the same as those in Embodiment 1.

External electrodes 50 include first external electrode 51, second external electrode 52, and third external electrode 53.

As illustrated in FIG. 15, first external electrode 51, second external electrode 52, and third external electrode 53 are each provided on a portion of bottom surface 16 and a portion of top surface 17. Portions of first external electrode 51 provided on bottom surface 16 and top surface 17 are connected to a portion of first external electrode 51 provided on first lateral surface 11. Portions of second external electrode 52 provided on bottom surface 16 and top surface 17 are connected to a portion of second external electrode 52 provided on first lateral surface 11. Portions of third external electrode 53 provided on bottom surface 16 and top surface 17 are connected to a portion of third external electrode 53 provided on second lateral surface 12.

First external electrode 51, second external electrode 52, and third external electrode 53 extend from bottom surface 16 and onto top surface 17. Thus, the heights of first external electrode 51, second external electrode 52, and third external electrode 53 are the same as height h of the varistor-material sintered body.

Figure 16:
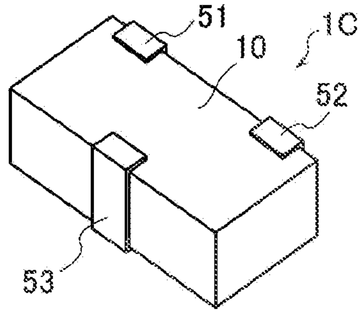
FIG. 16 illustrates electric flux densities generated in varistor components according to Embodiment 2 and the comparative example.
Figure 16:
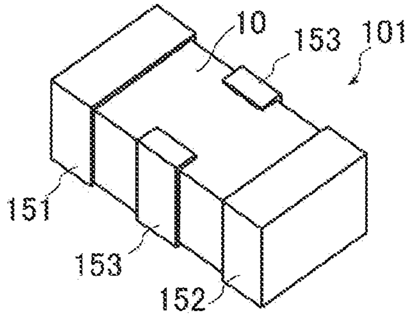
Figure 16:
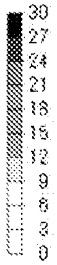
Figure 16:
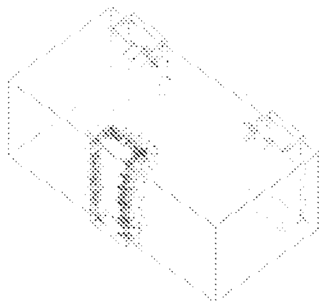
Figure 16:
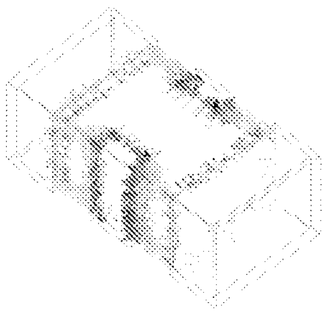

FIG. 16 illustrates electric flux densities generated in the varistor components according to Embodiment 2 and the comparative example. The drawing shows results of simulations conducted under the same setting conditions as those in FIG. 7. Varistor component 101 in the comparative example is as described with reference to FIG. 7.

In Embodiment 2, although a portion where an electric flux density is high appears in the vicinity of third external electrode 53 provided on second lateral surface 12, such portions where an electric flux density is high are less than those in the comparative example. In Embodiment 2, external electrodes 50 having different potentials are provided so as not to be adjacent to one another on the lateral surfaces. Accordingly, when varistor component 1C is viewed as a whole, portions where an electric flux density is high are less than those in the comparative example, and also a stray capacitance is smaller than that in the comparative example.

In this manner, in varistor component 1C according to Embodiment 2, first external electrode 51, second external electrode 52, and third external electrode 53 are not provided on third lateral surface 13 or fourth lateral surface 14. Further, on second lateral surface 12, only third external electrode 53 is provided, and both first external electrode 51 and second external electrode 52 are not provided. Further, on first lateral surface 11, only first external electrode 51 and second external electrode 52 are provided, and third external electrode 53 is not provided. Accordingly, in varistor component 1C, a portion where an electric flux density is high can be reduced, and a stray capacitance can be decreased.

Embodiment 3

Varistor component 1D according to Embodiment 3 is to be described. In Embodiment 3, an example is to be described in which first external electrode 51, second external electrode 52, and third external electrode 53 are provided on both first lateral surface 11 and second lateral surface 12.

Figure 17:
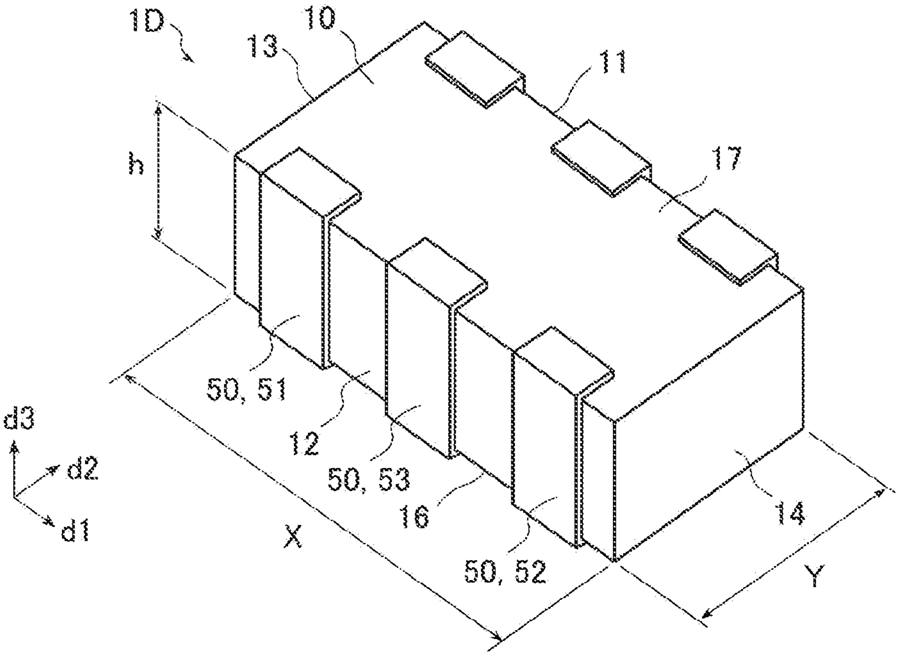
FIG. 17 is a perspective view of a varistor component according to Embodiment 3.

FIG. 17 is a perspective view of varistor component 1D according to Embodiment 3.

Varistor component 1D according to Embodiment 3 also includes varistor-material sintered body 10, external electrodes 50, and internal electrodes 30. Configurations of varistor-material sintered body 10 and internal electrodes 30 are the same as those in Embodiment 1.

External electrodes 50 include first external electrode 51, second external electrode 52, and third external electrode 53.

First external electrode 51, second external electrode 52, and third external electrode 53 are each provided on a portion of bottom surface 16, a portion of top surface 17, a portion of first lateral surface 11, and a portion of second lateral surface 12. A portion of first external electrode 51 provided on first lateral surface 11 is on a side opposite from a portion of first external electrode 51 provided on second lateral surface 12. A portion of second external electrode 52 provided on first lateral surface 11 is on a side opposite from a portion of second external electrode 52 provided on second lateral surface 12. A portion of third external electrode 53 provided on first lateral surface 11 is on a side opposite from a portion of third external electrode 53 provided on second lateral surface 12.

Portions of first external electrode 51 provided on bottom surface 16 and top surface 17 are connected to portions of first external electrode 51 provided on first lateral surface 11 and second lateral surface 12. Portions of second external electrode 52 provided on bottom surface 16 and top surface 17 are connected to portions of second external electrode 52 provided on first lateral surface 11 and second lateral surface 12. Portions of third external electrode 53 provided on bottom surface 16 and top surface 17 are connected to portions of third external electrode 53 provided on first lateral surface 11 and second lateral surface 12.

Note that first external electrode 51, second external electrode 52, and third external electrode 53 are not provided on third lateral surface 13 or fourth lateral surface 14.

First external electrode 51, second external electrode 52, and third external electrode 53 are provided on first lateral surface 11 and second lateral surface 12, being spaced apart from one another in first direction d1. Third external electrode 53 is located between first external electrode 51 and second external electrode 52 when viewed in second direction d2. More specifically, third external electrode 53 is located in the middle between first external electrode 51 and second external electrode 52 when viewed in second direction d2. For example, a space between first external electrode 51 and third external electrode 53 in first direction d1 is 0.25 mm, and a space between second external electrode 52 and third external electrode 53 in first direction d1 is also 0.25 mm.

Figure 18:
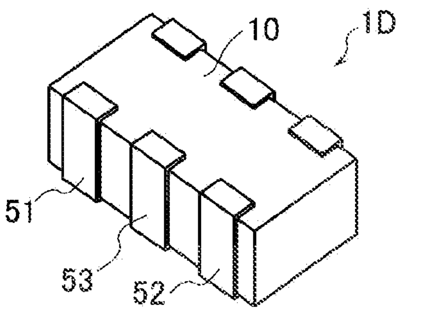
FIG. 18 illustrates electric flux densities generated in the varistor components according to Embodiment 3 and the comparative example.
Figure 18:
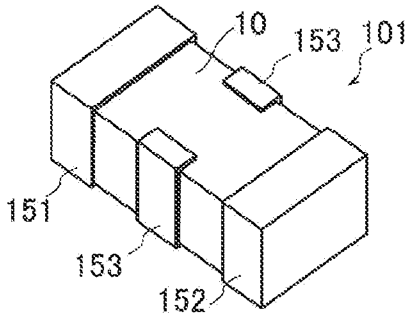
Figure 18:
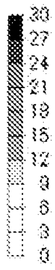
Figure 18:
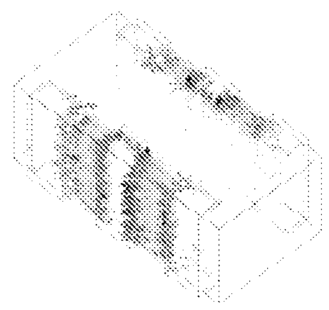
Figure 18:
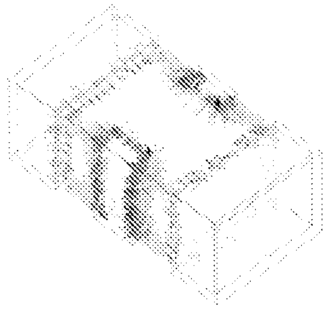

FIG. 18 illustrates electric flux densities generated in the varistor components according to Embodiment 3 and the comparative example. The drawing shows results of simulations conducted under the same setting conditions as those in FIG. 7. Varistor component 101 in the comparative example is as described with reference to FIG. 7.

In Embodiment 3, a portion in which an electric flux density is high appears between a portion of first external electrode 51 and a portion of third external electrode 53 provided on second lateral surface 12 and between a portion of second external electrode 52 and a portion of third external electrode 53 provided thereon, yet portions in which an electric flux density is high are less on top surface 17 than those in the comparative example.

In varistor component 1D according to Embodiment 3, first external electrode 51, second external electrode 52, and third external electrode 53 are not provided on third lateral surface 13 or fourth lateral surface 14. Accordingly, in varistor component 1D, a portion where an electric flux density is high is reduced, and a stray capacitance can be decreased.

SUMMARY

Varistor component 1 according to the present embodiment is a component that includes first varistor element Z1 and second varistor element Z2, the varistor component including: varistor-material sintered body 10 that includes: bottom surface 16; top surface 17 on a side of varistor-material sintered body 10 opposite from bottom surface 16; and a plurality of lateral surfaces that connect bottom surface 16 and top surface 17; first external electrode 51 that is a terminal at one end of first varistor element Z1 and is provided on a portion of first lateral surface 11 included in the plurality of lateral surfaces; second external electrode 52 that is a terminal at one end of second varistor element Z2 and is provided on a portion of first lateral surface 11; and third external electrode 53 that is a common terminal at another end of first varistor element Z1 and another end of second varistor element Z2, and is provided on a portion of second lateral surface 12 on a side of varistor-material sintered body 10 opposite from first lateral surface 11, second lateral surface 12 being included in the plurality of lateral surfaces. The plurality of lateral surfaces further include third lateral surface 13 and fourth lateral surface 14, third lateral surface 13 being orthogonal to both of first lateral surface 11 and bottom surface 16, fourth lateral surface 14 being on a side of varistor-material sintered body 10 opposite from third lateral surface 13. First external electrode 51, second external electrode 52, and third external electrode 53 are not provided on third lateral surface 13 or fourth lateral surface 14. First external electrode 51 and second external electrode 52 are spaced apart from each other in first direction d1 on first lateral surface 11, first direction d1 being a direction in which third lateral surface 13 and fourth lateral surface 14 are directed. Third external electrode 53 provided on the portion of second lateral surface 12 is located between first external electrode 51 and second external electrode 52, when third external electrode 53 is viewed in second direction d2, second direction d2 being a direction in which first lateral surface 11 and second lateral surface 12 are directed.

Accordingly, since a configuration in which first external electrode 51, second external electrode 52, and third external electrode 53 are not provided on third lateral surface 13 or fourth lateral surface 14, a stray capacitance generated in varistor component 1 due to third lateral surface 13 and fourth lateral surface 14 can be reduced.

When third external electrode 53 is viewed in second direction d2, third external electrode 53 may be located in a middle between first external electrode 51 and second external electrode 52.

With this configuration, first external electrode 51, second external electrode 52, and third external electrode 53 when viewed in second direction d2 can be disposed symmetrically, and a difference between a stray capacitance generated between first external electrode 51 and third external electrode 53 and a stray capacitance generated between second external electrode 52 and third external electrode 53 can be decreased. Accordingly, a difference in capacitance between first varistor element Z1 and second varistor element Z2 can be decreased, and influence on the operation of an electronic device can be reduced.

First external electrode 51 and second external electrode 52 may be connected to different signal wires, and third external electrode 53 may be connected to a ground.

According to this, for example, even when first external electrode 51 and second external electrode 52 are connected to different signal wires on a communication line, a difference in capacitance between first varistor element Z1 and second varistor element Z2 can be decreased, and influence on the operation of an electronic device can be reduced.

First external electrode 51 and second external electrode 52 may each be provided further on a portion of bottom surface 16 and a portion of second lateral surface 12, and third external electrode 53 may be provided further on a portion of bottom surface 16 and a portion of first lateral surface 11.

According to varistor component 1D having the above configuration, first external electrode 51, second external electrode 52, and third external electrode 53 are disposed in the same manner on first lateral surface 11 and on second lateral surface 12, and thus a stray capacitance between external electrodes 50 generated on each of first lateral surface 11 and second lateral surface 12 can be decreased. Accordingly, a difference in capacitance between first varistor element Z1 and second varistor element Z2 can be decreased, and influence on the operation of an electronic device can be reduced.

First external electrode 51 and second external electrode 52 may not be provided on second lateral surface 12, and third external electrode 53 may not be provided on first lateral surface 11.

According to this, first external electrode 51 and second external electrode 52 can be provided only on first lateral surface 11, and third external electrode 53 can be provided only on second lateral surface 12. Thus, a portion in which an electric flux density is high can be decreased on each of first external electrode 51 and second external electrode 52. Accordingly, a stray capacitance generated in varistor component 1 can be decreased.

First external electrode 51, second external electrode 52, and third external electrode 53 may extend from bottom surface 16 toward top surface 17, and may not be provided on top surface 17. First external electrode 51, second external electrode 52, and third external electrode 53 extending from bottom surface 16 toward top surface 17 may each have height he that is at least half height h of varistor-material sintered body 10 and lower than height h of varistor-material sintered body 10.

In this manner, a stray capacitance generated in varistor component 1 can be decreased by setting height he of each of first external electrode 51, second external electrode 52, and third external electrode 53 to a height at least half and lower than height h of varistor-material sintered body 10.

Furthermore, varistor component 1 may further include: first internal electrode 31 connected to first external electrode 51 and provided inside varistor-material sintered body 10; second internal electrode 32 connected to second external electrode 52 and provided inside varistor-material sintered body 10; and third internal electrode 33 connected to third external electrode 53 and provided inside varistor-material sintered body 10. Varistor component 1 may include: first facing region 41 in which first internal electrode 31 and third internal electrode 33 face each other; and second facing region 42 in which second internal electrode 32 and third internal electrode 33 face each other.

Accordingly, since capacitances are generated in regions in each of which internal electrodes face each other, varistor component 1 having smaller variations in capacitance can be provided.

Third internal electrode 33 may be provided closer to top surface 17 than first internal electrode 31 and second internal electrode 32 are to top surface 17.

With this configuration, as compared with the case where third internal electrode 33 is provided closer to bottom surface 16 than first internal electrode 31 and second internal electrode 32 are thereto, a stray capacitance generated in varistor component 1 can be reduced.

First facing region 41 and second facing region 42 may be located closer to first lateral surface 11 than to second lateral surface 12, when first facing region 41 and second facing region 42 are viewed in third direction d3, third direction d3 being a direction in which bottom surface 16 and top surface 17 are directed.

With this configuration, as compared with the case where first facing region 41 and second facing region 42 are provided closer to second lateral surface 12 than to first lateral surface 11, a stray capacitance generated in varistor component 1 can be reduced.

First internal electrode 31, second internal electrode 32, and third internal electrode 33 may be provided line-symmetrically with respect to central line cL2 passing through a middle position between first external electrode 51 and second external electrode 52 and extending in second direction d2, when first internal electrode 31, second internal electrode 32, and third internal electrode 33 are viewed in third direction d3.

With this configuration, a difference in stray capacitance generated on the right and left of central line cL2 can be decreased, and thus, a difference in capacitance generated in first varistor element Z1 and second varistor element Z2 can be decreased. Accordingly, influence on the operation of an electronic device can be reduced.

First internal electrode 31, second internal electrode 32, and third internal electrode 33 may be provided line-symmetrically with respect to central line cL3 passing through a middle position between first external electrode 51 and second external electrode 52 and extending in third direction d3, when first internal electrode 31, second internal electrode 32, and third internal electrode 33 are viewed in second direction d2.

With this configuration, a difference in stray capacitance generated on the right and left of central line cL3 can be decreased, and thus, a difference in capacitance generated in first varistor element Z1 and second varistor element Z2 can be decreased. Accordingly, influence on the operation of an electronic device can be reduced.

First internal electrode 31 and second internal electrode 32 may each extend from first lateral surface 11 toward second lateral surface 12. Third internal electrode 33 may include: extraction electrode portion 35 extending from second lateral surface 12 toward first lateral surface 11; first counter electrode portion 36 connected to extraction electrode portion 35 and extending toward third lateral surface 13; and second counter electrode portion 37 connected to extraction electrode portion 35 and extending toward fourth lateral surface 14. First facing region 41 may include a portion of first counter electrode portion 36 and a portion of first internal electrode 31 that face each other, and second facing region 42 may include a portion of second counter electrode portion 37 and a portion of second internal electrode 32 that face each other.

According to this, first facing region 41 and second facing region 42 can be provided accurately. Accordingly, a stray capacitance generated in varistor component 1 can be decreased.

First internal electrode 31 and second internal electrode 32 may each extend from first lateral surface 11 toward second lateral surface 12. Third internal electrode 33 may include: first extraction electrode portion **35*a* extending from second lateral surface 12 toward first lateral surface 11; second extraction electrode portion 35*b* connected to first extraction electrode portion 35*a* and extending toward third lateral surface 13 and fourth lateral surface 14; and first counter electrode portion 36 and second counter electrode portion 37 connected to second extraction electrode portion 35*b* and extending toward first lateral surface 11. First facing region 41 may include a portion of first counter electrode portion 36 and a portion of first internal electrode 31 that face each other, and second facing region 42 may include a portion of second counter electrode portion 37 and a portion of second internal electrode 32** that face each other.

According to this, first facing region 41 and second facing region 42 can be provided accurately. Accordingly, a stray capacitance generated in varistor component 1 can be decreased.

First external electrode 51 may be provided further on a portion of bottom surface 16. Second external electrode 52 may be provided further on a portion of bottom surface 16. First internal electrode 31 may be provided between the portion of first counter electrode portion 36 and first external electrode 51 provided on the portion of bottom surface 16, and second internal electrode 32 may be provided between the portion of second counter electrode portion 37 and second external electrode 52 provided on the portion of bottom surface 16.

This configuration achieves a structure in which first counter electrode portion 36 and first external electrode 51 face each other with first internal electrode 31 being provided therebetween, and a stray capacitance generated between first counter electrode portion 36 and first external electrode 51 can be decreased. This configuration further achieves a structure in which second counter electrode portion 37 and second external electrode 52 face each other with second internal electrode 32 being provided therebetween, and a stray capacitance generated between second counter electrode portion 37 and second external electrode 52 can be decreased.

Other Embodiments

The above has described varistor components according to embodiments and variations of the present disclosure, yet the present disclosure is not limited to the embodiments and the variations described above. The scope of the present disclosure also encompasses embodiments resulting from applying various modifications, which may be conceived by those skilled in the art, to the embodiments and the variations and other embodiments resulting from combining some elements in the embodiments and the variations, without departing from the gist of the present disclosure.

Embodiment 1 has shown an example in which first counter electrode portion 36 is provided closer to top surface 17 than first internal electrode 31 is thereto, and second counter electrode portion 37 is provided closer to top surface 17 than second internal electrode 32 is thereto, but is not limited to the example. For example, one of the two counter electrode portions may be provided closer to bottom surface 16 than the internal electrodes are thereto. Specifically, first counter electrode portion 36 may be provided closer to bottom surface 16 than first internal electrode 31 is thereto, and second counter electrode portion 37 may be provided closer to top surface 17 than second internal electrode 32 is thereto. On the contrary, first counter electrode portion 36 may be provided closer to top surface 17 than first internal electrode 31 is thereto, and second counter electrode portion 37 may be provided closer to bottom surface 16 than second internal electrode 32 is thereto.

INDUSTRIAL APPLICABILITY

A varistor component according to the present disclosure is useful as a varistor component for use in various electronic devices and various communication systems.

REFERENCE SIGNS LIST

- 1, 1A, 1B, 1C, 1D varistor component
- 10 varistor-material sintered body
- 11 first lateral surface
- 12 second lateral surface
- 13 third lateral surface
- 14 fourth lateral surface
- 16 bottom surface
- 17 top surface
- 30 internal electrode
- 31 first internal electrode
- 32 second internal electrode
- 33 third internal electrode
- 35, **35*a*, 35*b*** extraction electrode portion
- 36 first counter electrode portion
- 37 second counter electrode portion
- 41 first facing region
- 42 second facing region
- 50 external electrode
- 51 first external electrode
- 52 second external electrode
- 53 third external electrode
- cL2, cL3 central line
- d1 first direction
- d2 second direction
- d3 third direction
- h, he height
- X length
- Y width
- y1, y2 distance
- Z1 first varistor element
- Z2 second varistor element

The invention claimed is:

1. A varistor component that includes a first varistor element and a second varistor element, the varistor component comprising:

a varistor-material sintered body that includes:

a bottom surface;

a top surface on a side of the varistor-material sintered body opposite from the bottom surface; and a plurality of lateral surfaces that connect the bottom surface and the top surface;

a first external electrode that is a terminal at one end of the first varistor element and is provided on a portion of a first lateral surface included in the plurality of lateral surfaces;

a second external electrode that is a terminal at one end of the second varistor element and is provided on a portion of the first lateral surface; and a third external electrode that is a common terminal at an other end of the first varistor element and an other end of the second varistor element, and is provided on a portion of a second lateral surface on a side of the varistor-material sintered body opposite from the first lateral surface, the second lateral surface being included in the plurality of lateral surfaces, wherein the plurality of lateral surfaces further include a third lateral surface and a fourth lateral surface, the third lateral surface being orthogonal to both of the first lateral surface and the bottom surface, the fourth lateral surface being on a side of the varistor-material sintered body opposite from the third lateral surface, the first external electrode, the second external electrode, and the third external electrode are not provided on the third lateral surface or the fourth lateral surface, the first external electrode and the second external electrode are spaced apart from each other in a first direction on the first lateral surface, the first direction being a direction in which the third lateral surface and the fourth lateral surface are directed, and the third external electrode provided on the portion of the second lateral surface is located between the first external electrode and the second external electrode, when the third external electrode is viewed in a second direction, the second direction being a direction in which the first lateral surface and the second lateral surface are directed.

2. The varistor component according to claim 1, wherein when the third external electrode is viewed in the second direction, the third external electrode is located in a middle between the first external electrode and the second external electrode.

3. The varistor component according to claim 1, wherein the first external electrode and the second external electrode are connected to different signal wires, and the third external electrode is connected to a ground.

4. The varistor component according to claim 1, wherein the first external electrode and the second external electrode are each provided further on a portion of the bottom surface and a portion of the second lateral surface, and the third external electrode is provided further on a portion of the bottom surface and a portion of the first lateral surface.

5. The varistor component according to claim 1, wherein the first external electrode and the second external electrode are not provided on the second lateral surface, and the third external electrode is not provided on the first lateral surface.

6. The varistor component according to claim 5, wherein the first external electrode, the second external electrode, and the third external electrode extend from the bottom surface toward the top surface, and are not provided on the top surface, and the first external electrode, the second external electrode, and the third external electrode extending from the bottom surface toward the top surface each have a height that is at least half a height of the varistor-material sintered body and lower than the height of the varistor-material sintered body.

7. The varistor component according to claim 5, further comprising:

a first internal electrode connected to the first external electrode and provided inside the varistor-material sintered body;

a second internal electrode connected to the second external electrode and provided inside the varistor-material sintered body; and a third internal electrode connected to the third external electrode and provided inside the varistor-material sintered body, wherein the varistor component includes:

a first facing region in which the first internal electrode and the third internal electrode face each other; and a second facing region in which the second internal electrode and the third internal electrode face each other.

8. The varistor component according to claim 7, wherein the third internal electrode is provided closer to the top surface than the first internal electrode and the second internal electrode are to the top surface.

9. The varistor component according to claim 7, wherein the first facing region and the second facing region are located closer to the first lateral surface than to the second lateral surface, when the first facing region and the second facing region are viewed in a third direction, the third direction being a direction in which the bottom surface and the top surface are directed.

10. The varistor component according to claim 9, wherein the first internal electrode, the second internal electrode, and the third internal electrode are provided line-symmetrically with respect to a central line passing through a middle position between the first external electrode and the second external electrode and extending in the second direction, when the first internal electrode, the second internal electrode, and the third internal electrode are viewed in the third direction.

11. The varistor component according to claim 9, wherein the first internal electrode, the second internal electrode, and the third internal electrode are provided line-symmetrically with respect to a central line passing through a middle position between the first external electrode and the second external electrode and extending in the third direction, when the first internal electrode, the second internal electrode, and the third internal electrode are viewed in the second direction.

12. The varistor component according to claim 7, wherein the first internal electrode and the second internal electrode each extend from the first lateral surface toward the second lateral surface, the third internal electrode includes:

an extraction electrode portion extending from the second lateral surface toward the first lateral surface;

a first counter electrode portion connected to the extraction electrode portion and extending toward the third lateral surface; and a second counter electrode portion connected to the extraction electrode portion and extending toward the fourth lateral surface, the first facing region includes a portion of the first counter electrode portion and a portion of the first internal electrode that face each other, and the second facing region includes a portion of the second counter electrode portion and a portion of the second internal electrode that face each other.

13. The varistor component according to claim 7, wherein the first internal electrode and the second internal electrode each extend from the first lateral surface toward the second lateral surface, the third internal electrode includes:

a first extraction electrode portion extending from the second lateral surface toward the first lateral surface;

a second extraction electrode portion connected to the first extraction electrode portion and extending toward the third lateral surface and the fourth lateral surface; and a first counter electrode portion and a second counter electrode portion connected to the second extraction electrode portion and extending toward the first lateral surface, the first facing region includes a portion of the first counter electrode portion and a portion of the first internal electrode that face each other, and the second facing region includes a portion of the second counter electrode portion and a portion of the second internal electrode that face each other.

14. The varistor component according to claim 12, wherein the first external electrode is provided further on a portion of the bottom surface, the second external electrode is provided further on a portion of the bottom surface, the first internal electrode is provided between the portion of the first counter electrode portion and the first external electrode provided on the portion of the bottom surface, and the second internal electrode is provided between the portion of the second counter electrode portion and the second external electrode provided on the portion of the bottom surface.

* * * * *